United States Patent
Ryu et al.

(10) Patent No.: US 10,298,314 B2
(45) Date of Patent: *May 21, 2019

(54) REPEATER OPERATION METHOD AND APPARATUS IN WIRELESS COMMUNICATION SYSTEM

(71) Applicant: LG ELECTRONICS INC., Seoul (KR)

(72) Inventors: Jinsook Ryu, Seoul (KR); Laeyoung Kim, Seoul (KR); Hyunsook Kim, Seoul (KR); Jaehyun Kim, Seoul (KR); Taehun Kim, Seoul (KR); Taehyeon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/819,091

(22) Filed: Nov. 21, 2017

(65) Prior Publication Data

US 2018/0076878 A1     Mar. 15, 2018

Related U.S. Application Data

(63) Continuation of application No. 14/912,572, filed as application No. PCT/KR2014/007618 on Aug. 18, 2014, now Pat. No. 9,853,709.

(Continued)

(51) Int. Cl.
*H04B 7/155* (2006.01)
*H04W 72/04* (2009.01)
*H04W 64/00* (2009.01)

(52) U.S. Cl.
CPC ...... *H04B 7/15507* (2013.01); *H04W 64/006* (2013.01); *H04W 72/048* (2013.01); *H04W 72/042* (2013.01)

(58) Field of Classification Search
CPC ............ H04B 7/15507; H04W 64/006; H04W 72/042; H04W 72/048

(Continued)

(56) References Cited

U.S. PATENT DOCUMENTS 9,668,232 B2    5/2017  Patil et al.
9,713,072 B2    7/2017  Liao et al.

(Continued)

FOREIGN PATENT DOCUMENTS

CN       102217352 A     10/2011
CN       103155693 A      6/2013

(Continued)

OTHER PUBLICATIONS

U.S. Appl. No. 14/912,572, filed Feb. 17, 2016.

*Primary Examiner* — Tan H Trinh
(74) *Attorney, Agent, or Firm* — Birch, Stewart, Kolasch & Birch, LLP

(57) ABSTRACT

A method of supporting a user equipment (UE) to UE (UE-to-UE) communication by a network in a wireless communication system, the method includes transmitting a system information block associated with the UE-to-UE communication, wherein the system information block contains a period parameter indicating a periodicity at which a relay UE transmits discovery announcement, wherein the system information block contains a high threshold value and a low threshold value, wherein the relay UE is not allowed to transmit the discovery announcement if a reference signal received power (RSRP) measured by the relay UE is above the high threshold value, and wherein the relay UE is not allowed to transmit the discovery announcement if the RSRP measured by the relay UE is below the low threshold value.

20 Claims, 12 Drawing Sheets

Related U.S. Application Data

(60) Provisional application No. 61/867,134, filed on Aug. 18, 2013.

(58) Field of Classification Search
USPC ..... 455/41.1, 41.2, 11.1, 418; 370/252, 311, 370/315, 329, 336
See application file for complete search history.

(56) References Cited

U.S. PATENT DOCUMENTS

| | | |
|---|---|---|
| 2009/0296627 A1 | 12/2009 | Lee et al. |
| 2010/0034135 A1* | 2/2010 | Kim .................. H04B 7/2606 370/315 |
| 2010/0167743 A1 | 7/2010 | Palanki et al. |
| 2011/0106837 A1 | 5/2011 | Walton et al. |
| 2011/0124330 A1 | 5/2011 | Kojima |
| 2011/0141963 A1 | 6/2011 | Lim |
| 2011/0199905 A1 | 8/2011 | Pinheiro et al. |
| 2011/0268016 A1 | 11/2011 | Youn et al. |
| 2012/0093054 A1 | 4/2012 | Liu et al. |
| 2012/0106437 A1 | 5/2012 | Seo et al. |
| 2012/0236776 A1 | 9/2012 | Zhang et al. |
| 2012/0314600 A1 | 12/2012 | Zeira |
| 2012/0315841 A1* | 12/2012 | Zhou .................. H04B 7/2606 455/11.1 |
| 2012/0324046 A1 | 12/2012 | Park |
| 2013/0010684 A1 | 1/2013 | Park et al. |
| 2013/0042011 A1 | 2/2013 | Sugizaki et al. |
| 2013/0083744 A1* | 4/2013 | Peng .................. H04W 52/04 370/329 |
| 2013/0121279 A1 | 5/2013 | Noh et al. |
| 2013/0170470 A1 | 7/2013 | Kneckt et al. |
| 2013/0229931 A1* | 9/2013 | Kim .................. H04W 24/10 370/252 |
| 2013/0235758 A1 | 9/2013 | Delmas et al. |
| 2013/0267202 A1 | 10/2013 | Palanigounder et al. |
| 2013/0294352 A1 | 11/2013 | Park et al. |
| 2013/0295926 A1 | 11/2013 | Michel et al. |
| 2013/0322388 A1 | 12/2013 | Ahn et al. |
| 2014/0056165 A1 | 2/2014 | Siomina et al. |
| 2014/0056220 A1 | 2/2014 | Poitau et al. |
| 2014/0242963 A1* | 8/2014 | Novlan .................. H04W 48/16 455/418 |
| 2014/0269558 A1 | 9/2014 | Sartori et al. |
| 2014/0301289 A1 | 10/2014 | Johnsson et al. |
| 2014/0302786 A1 | 10/2014 | Kasslin et al. |
| 2014/0302787 A1 | 10/2014 | Rantala et al. |
| 2015/0009875 A1* | 1/2015 | Khoryaev ............. H04W 48/16 370/311 |
| 2015/0029866 A1 | 1/2015 | Liao et al. |
| 2015/0036578 A1 | 2/2015 | Wu et al. |
| 2015/0038136 A1 | 2/2015 | Wu et al. |
| 2015/0173113 A1* | 6/2015 | Liu ..................... H04W 72/042 370/329 |
| 2015/0181366 A1* | 6/2015 | Chae .................. H04W 56/004 370/336 |
| 2015/0181523 A1 | 6/2015 | Koskinen |
| 2015/0215028 A1* | 7/2015 | Ljung .................. H04W 88/04 370/315 |
| 2015/0230114 A1 | 8/2015 | Delsol et al. |
| 2015/0264551 A1 | 9/2015 | Ko et al. |
| 2015/0334555 A1 | 11/2015 | Seo et al. |
| 2016/0020890 A1* | 1/2016 | Sirotkin ................. H04W 4/70 370/352 |
| 2016/0037530 A1 | 2/2016 | Peng et al. |
| 2016/0057761 A1 | 2/2016 | Panaitopol |
| 2016/0150584 A1 | 5/2016 | Ohta et al. |
| 2016/0183276 A1 | 6/2016 | Marinier et al. |
| 2016/0234670 A1* | 8/2016 | Zhang .................. H04W 8/005 |
| 2016/0302251 A1* | 10/2016 | Chatterjee ............. H04W 8/005 |
| 2017/0118741 A1* | 4/2017 | Jung .................. H04W 76/14 |

FOREIGN PATENT DOCUMENTS

| | | |
|---|---|---|
| KR | 10-2009-0047859 A | 5/2009 |
| KR | 10-2009-0124174 A | 12/2009 |
| KR | 10-2012-0063081 A | 6/2012 |
| KR | 10-2012-0071113 A | 7/2012 |
| KR | 10-2012-0074255 A | 7/2012 |
| WO | WO 2011/103719 A1 | 9/2011 |
| WO | WO 2012/091418 A2 | 7/2012 |

* cited by examiner (a) Control-plane protocol stack (b) User-plane protocol stack (a)

(b)

(a) UE-to-Network or
UE-to-UE relay (b) UE - to - UE relay

REPEATER OPERATION METHOD AND APPARATUS IN WIRELESS COMMUNICATION SYSTEM

CROSS-REFERENCE TO RELATED APPLICATIONS

This application is a Continuation of co-pending U.S. patent application Ser. No. 14/912,572 filed on Feb. 17, 2016, which is the National Phase of PCT International Application No. PCT/KR2014/007618 filed on Aug. 18, 2014, which claims the benefit under 35 U.S.C. § 119(e) to U.S. Provisional Application No. 61/867,134 filed on Aug. 18, 2013, all of which are hereby expressly incorporated by reference into the present application.

BACKGROUND OF THE INVENTION

Field of the Invention

The present invention relates to a wireless communication system, and more particularly, to a repeater operation method and apparatus.

Discussion of the Related Art

A relay is an entity that performs a function of assisting signal transmission and reception between a donor base station and a user equipment. The relay can be introduced for the purpose of expansion in service coverage, improvement in throughput at a cell edge.

According to the related art, the relay is designed and used by considering that it operates at a fixed location. However, in the case of a mobile relay, it should be designed in consideration of not only variable locations but also a high speed movement. For instance, there may be a case that a relay is located in a high-speed train. In particular, in case that the location of the relay varies depending on time, a cell formed by the relay may have mobility and the cell can be referred to as a mobile cell. Moreover, in order to implement such a mobile relay, a method for a user equipment to operate as a relay has been discussed.

A Proximity service (ProSe) means a method of supporting communication between physically adjacent devices. Particularly, the ProSe aims at supporting operations of discovering an application running between the adjacent devices and exchanging application-related data between the devices. For instance, the ProSe is considered to apply applications for SNS (social network service), business, game and the like.

Moreover, the ProSe can be also referred to as D2D (device-to-device) communication. The D2D communication means a communication scheme that enables a plurality of devices (e.g., user equipments (UEs)) to directly exchange user data (e.g., voice data, multimedia data, etc.) without a network in a manner of establishing a direct link between the devices. ProSe communication can include UE-to-UE communication, peer-to-peer communication and the like. And, the ProSe communication can be applied to M2M (machine-to-machine) communication, MTC (machine type communication) and the like. Thus, the ProSe is considered as one method capable of solving a burden of a base station caused by rapidly increasing data traffic. Furthermore, if the ProSe is introduced, benefits such as reduction in a procedure of the base station, reduction in power consumption of devices participating in the ProSe, increase in a data transfer rate, increase in capacity of a network, load distribution, expansion in cell coverage, and the like may be expected.

A ProSe technology includes a UE-relay technology and the UE-relay technology means a technology for supporting a UE capable of operating as a relay (hereinafter referred to as UE-relay (UE-R)).

SUMMARY OF THE INVENTION

The technical task of the present invention is to provide, in case of determining a UE suitable for performing a function as a relay, a method for a network to discover an optimized UE-relay with minimized power consumption of the UE.

Technical tasks obtainable from the present invention are non-limited by the above-mentioned technical task. And, other unmentioned technical tasks can be clearly understood from the following description by those having ordinary skill in the technical field to which the present invention pertains.

In a $1^{st}$ technical aspect of the present invention, provided herein is a method of supporting a relay, which is supported by a base station in a wireless communication system, including the steps of determining whether relay communication for a target user equipment (UE) is needed and transmitting a relay activation message to one or more relay candidates. The activation message may include at least one parameter selected from the group consisting of an activation period, a location, and a threshold of signal strength for the one or more relay candidates. Among the one or more relay candidates, a relay satisfying conditions given by the at least one parameter may be activated as a relay for the target UE.

In a $2^{nd}$ technical aspect of the present invention, provided herein is a base station apparatus configured to support a relay in a wireless communication system, including a transceiver module and a processor. The processor may be configured to determine whether relay communication for a target user equipment (UE) is needed and to transmit a relay activation message to one or more relay candidates using the transceiver module. The activation message may include at least one parameter selected from the group consisting of an activation period, a location, and a threshold of signal strength for the one or more relay candidates. Among the one or more relay candidates, a relay satisfying conditions given by the at least one parameter may be activated as a relay for the target UE.

The following matters may be included in the $1^{st}$ and $2^{nd}$ technical aspects of the present invention.

Whether the relay communication is needed may be determined based on at least one selected from the group consisting of a request from the target UE, status information of the target UE, and situation information of a surrounding cell.

The request from the target UE may include at least one selected from the group consisting of information indicating a degree of necessity for the relay communication, location information of the target UE, and information indicating the amount of resources required by the target UE.

The status information of the target UE may include at least one of information on a distance with respect to the target UE and information on a link quality with respect to the target UE.

The situation information of the surrounding cell may include at least one of load information of the surrounding cell and information on whether the surrounding cell is activated. The situation information of the surrounding cell may be provided by at least one selected from the group consisting of one or more different UEs except the target UE, a different base station, and a core network.

The activation message may correspond to either a dedicated message transmitted to each of the one or more relay candidates or a broadcast signal transmitted to the one or more relay candidates.

The relay may correspond to either a mobile relay or a UE-relay.

In a 3$^{rd}$ technical aspect of the present invention, provided herein is a method of operating a relay in a wireless communication system, including the steps of receiving a relay activation message including at least one parameter selected from the group consisting of an activation period, a location, and a threshold of signal strength from a base station and if conditions given by the at least one parameter are satisfied, performing activation as a relay for a target user equipment (UE).

In a 4$^{th}$ technical aspect of the present invention, provided herein is a relay apparatus configured to operate in a wireless communication system, including a transceiver module and a processor. The processor may be configured to receive a relay activation message including at least one parameter selected from the group consisting of an activation period, a location, and a threshold of signal strength from a base station using the transceiver module. If conditions given by the at least one parameter are satisfied, the processor may be configured to perform activation as a relay for a target user equipment (UE).

The following matters may be included in the 3$^{rd}$ to 4$^{th}$ technical aspects of the present invention.

The step of performing the activation may include the step of initiating relay communication for the target UE according to the activation message from the base station.

The step of performing the activation may include the step of transmitting a signal for announcing relay capability of the relay around.

The step of performing the activation may include the step of monitoring a relay request from a UE around the relay.

The step of transmitting a signaling with respect to the relay may be further included. The signaling may include at least one selected from the group consisting of load information of the relay, location information of the relay, and static information on a relay requesting UE around the relay.

The relay may correspond to either a mobile relay or a UE-relay.

It is to be understood that both the foregoing general description and the following detailed description of the present invention are exemplary and explanatory and are intended to provide further explanation of the invention as claimed.

According to the present invention, in case of determining a UE suitable for performing a function as a relay, a method for a network to discover an optimized UE-relay with minimized power consumption of the UE can be provided.

Effects obtainable from the present invention are non-limited by the above mentioned effect. And, other unmentioned effects can be clearly understood from the following description by those having ordinary skill in the technical field to which the present invention pertains.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE EMBODIMENTS

Figure 1:
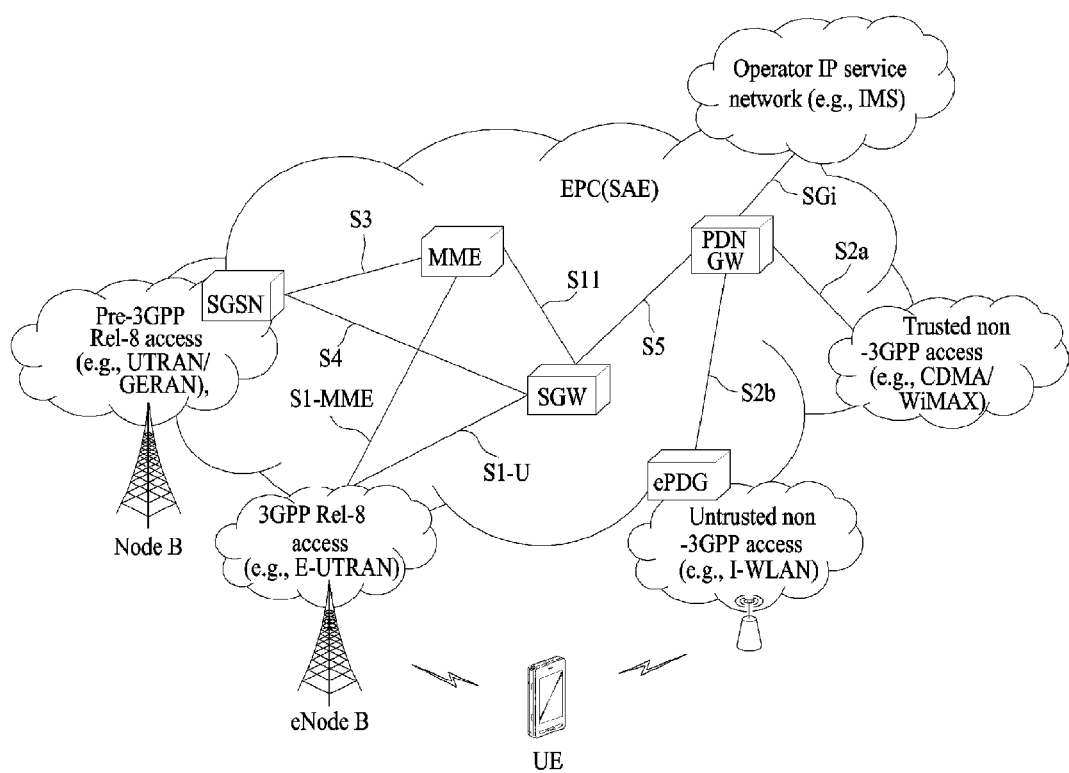
FIG. 1 is a diagram for a schematic structure of EPS (evolved packet system) including EPC (evolved packet core).

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be substituted with corresponding structural elements or features of another embodiment.

Specific terminologies used in the following description may be provided to help the understanding of the present invention. And, the use of the specific terminology may be modified into other forms within the scope of the technical idea of the present invention.

Occasionally, to avoid obscuring the concept of the present invention, structures and/or devices known to the public may be skipped or represented as block diagrams centering on the core functions of the structures and/or devices. Wherever possible, the same reference numbers will be used throughout the drawings to refer to the same or like parts in this specification.

The embodiments of the present invention may be supported by the disclosed standard documents of at least one of IEEE (Institute of Electrical and Electronics Engineers) 802 system, 3GPP system, 3GPP LTE system, LTE-A system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following technology may be used for various wireless communication systems. Although the following description will be made based on the 3GPP LTE and 3GPP LTE-A system for clarity, it is to be understood that the technical spirits of the present invention are not limited to the 3GPP LTE and 3GPP LTE-A system.

Terminologies used herein will be defined as follows.

UMTS (Universal Mobile Telecommunications System): GSM (Global System for Mobile Communication) based $3^{rd}$ generation mobile communication technology developed by the 3GPP.

EPS (Evolved Packet System): Network system that includes EPC (Evolved Packet Core), which is an IP based packet switched core network, and an access network such as LTE and UTRAN. This system is the network of an evolved version of the UMTS.

NodeB: Base station of GERAN/UTRAN. This base station is installed outdoor and its coverage has a scale of a macro cell.

eNodeB: Base station of LTE. This base station is installed outdoor and its coverage has a scale of a macro cell.

UE (User Equipment): The UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The UE enables communication through 3GPP spectrum such as LTE and/or non-3GPP spectrum such as WiFi and spectrum for public safety.

RAN (Radio Access Network): Unit that includes NodeB, eNodeB and RNC (Radio Network Controller) for controlling NodeB and eNodeB at a 3GPP network. The RAN exists between the UE and a core network and provides connection to the core network.

RANAP (RAN Application Part): Interface between the RAN and a node (MME/SGSN/MSC (Mobility Management Entity/Serving GPRS (General Packet Radio Service) Supporting Node/Mobiles Switching Center)) for handling control of the core network.

PLMN (Public Land Mobile Network): Network intended to provide individuals with mobile communication services. This network may be configured for each operator.

HNB (Home NodeB): CPE (Customer Premises Equipment) that provides UTRAN (UMTS Terrestrial Radio Access Network) coverage. More detailed matters may be understood with reference to standard document TS 25.467.

HeNodeB (Home eNodeB): CPE (Customer Premises Equipment) that provides E-UTRAN (Evolved-UTRAN) coverage. More detailed matters may be understood with reference to standard document TS 36.300.

CSG (Closed Subscriber Group): Subscriber group allowed to access one or more CSG cells within a PLMN (Public Land Mobile Network) as a member of CSG of H(e)NB.

PDN (Packet Data Network) connection: Logical connection between a UE expressed as one IP address (one IPv4 address and/or one IPv6 prefix) and a PDN expressed as APN (Access Point Name).

Proximity Services or Proximity-based Services (ProSe): Service that enables discovery between physically proximate devices, and mutual direct communication/communication through a base station/communication through the third party. In this case, user plane data are exchanged through a direct data path or a direct mode data path without through a 3GPP core network (e.g., EPC). The ProSe is also referred to as D2D (device-to-device) service.

Proximity: Depending on whether a predetermined proximity reference is satisfied, it is determined whether a UE is proximate to another UE. Proximity reference may be given differently for ProSe discovery and ProSe communication. Moreover, proximity reference may be set as a control target of a service provider.

ProSe-enabled UE: UE that supports ProSe discovery and/or ProSe communication. Hereinafter, the ProSe-enabled UE is referred to as a UE.

ProSe-enabled Network: Network that supports ProSe discovery and/or ProSe communication. Hereinafter, the ProSe-enabled Network is referred to as a network.

ProSe Communication: Communication between two or more proximate ProSe-enabled UEs that use ProSe communication paths. Unless defined separately and explicitly, 'Prose communication' may mean at least one of the following communication types: Prose E-UTRA communication between only two ProSe-enabled UEs; ProSe group communication or ProSe broadcast communication between public safety ProSe-enabled UEs; and ProSe-assisted WLAN direct communication.

ProSe E-UTRA Communication: ProSe communication that uses a ProSe E-UTRA communication path.

ProSe Broadcast Communication: One-to-all ProSe E-UTRA communication between authorized public safety ProSe-enabled UEs. A common Prose E-UTRA communication path established between the above-mentioned UEs may be used.

ProSe Group Communication: One-to-multiple ProSe communication between two or more proximate ProSe-enabled UEs. A common communication path established between the above-mentioned UEs may be used.

ProSe-assisted WLAN Direct Communication: ProSe communication that uses a ProSe-assisted WLAN direct communication path.

ProSe Communication Path: Communication path that supports ProSe communication. For instance, a communication path in ProSe E-UTRA communication (i.e., ProSe E-UTRA communication path) may be directly established between ProSe-enabled UEs using E-UTRA. Alternatively, it may be routed by local eNB(s). A communication path in ProSe-assisted WLAN direct communication (i.e., ProSe-assisted WLAN direct communication path) may be directly established between ProSe-enabled UEs using WLAN.

EPC Path or Infrastructure Data Path: User plane communication through EPC.

ProSe Discovery: Procedure for discriminating whether a Prose-enabled UE is proximate to another Prose-enabled UE using E-UTRA. The ProSe discovery may mean Prose direct discovery and/or EPC-level Prose discovery.

ProSe Direct Discovery: Procedure that is performed by a Prose-enabled UE to discover another nearby ProSe-enabled. This procedure may be performed using only capabilities of two UEs according to Release-12 E-UTRA technology. The ProSe direct discovery may include open ProSe direct discovery and/or restricted ProSe direct discovery.

EPC-level ProSe discovery: Procedure for EPC to determine proximity of two ProSe-enabled UEs and inform the two ProSe-enabled UEs of the proximity of the two ProSe-enabled UEs. The EPC-level ProSe discovery may include open EPC-level ProSe discovery and/or restricted EPC-level ProSe discovery.

Open ProSe Discovery: ProSe discovery that is performed without explicit permission from a discovered ProSe-enabled UE.

Restricted ProSe Discovery: ProSe discovery that is performed according to only explicit permission from a discovered ProSe-enabled UE.

ProSe UE-to-Network Relay: As a ProSe-enabled public safety UE, a relay operating as a communication relay between a Prose-enabled public safety UE and a ProSe-enabled network that uses E-UTRA.

ProSe UE-to-UE Relay: As a ProSe-enabled public safety UE, a relay operating as a ProSe communication relay between ProSe-enabled public safety UEs.

EPC (Evolved Packet Core)

FIG. 1 is a view schematically illustrating the architecture of an Evolved Packet System (EPS) including an Evolved Packet Core (EPC).

The EPC is a core element of System Architecture Evolution (SAE) for improving the performance of 3GPP technology. SAE corresponds to a study item for deciding a network structure supporting mobility among various types of network. SAE aims to provide, for example, an optimized packet-based system which supports various radio access technologies based on IP and provides improved data transfer capabilities.

Specifically, the EPC is a core network of an IP mobile communication system for a 3GPP LTE system and may support packet-based real-time and non-real-time services. In a legacy mobile communication system (e.g., 2nd or 3rd generation mobile communication system), a core network function is implemented through two separated sub-domains, e.g., circuit-switched (CS) sub-domain for sound and packet-switched (PS) sub-domain for data. However, in a 3GPP LTE system which is evolved from the 3rd generation communication system, the CS and PS sub-domains are unified into a single IP domain. For example, in the 3GPP LTE system, IP-capable UEs can be connected via an IP-based base station (e.g., eNodeB (evolved Node B)), an EPC, an application domain (e.g., IMS (IP Multimedia Subsystem)). That is, the EPC is a structure inevitably required to implement end-to-end IP service.

The EPC may include various components and FIG. 1 illustrates a few of the components, e.g., Serving GateWay (SGW), Packet Data Network GateWay (PDN GW), Mobility Management Entity (MME), Serving GPRS (General Packet Radio Service) Supporting Node (SGSN), and enhanced Packet Data Gateway (ePDG).

The SGW operates as a boundary point between a Radio Access Network (RAN) and a core network and is an element which performs a function for maintaining a data path between an eNodeB and a PDG GW. In addition, if a UE moves across an area served by an eNodeB, the SGW serves as a local mobility anchor point. That is, packets may be routed via the SGW for mobility in an Evolved-UMTS (Universal Mobile Telecommunications System) Terrestrial Radio Access Network (E-UTRAN) defined after 3GPP Release-8. Further, the SGW may serve as an anchor point for mobility management with another 3GPP network such as RAN defined before 3GPP Release-8, e.g., UTRAN or GSM (Global System for Mobile communication)/EDGE (Enhanced Data rates for GSM Evolution) Radio Access Network (GERAN).

The PDN GW (or P-GW) corresponds to a termination point of a data interface directed to a packet data network. The PDN GW may support policy enforcement features, packet filtering and charging support. In addition, the PDN GW may serve as an anchor point for mobility management with a 3GPP network and a non-3GPP network (e.g., untrusted network such as Interworking Wireless Local Area Network (I-WLAN) and trusted network such as Code Division Multiple Access (CDMA) or WiMax).

Although the SGW and the PDN GW are configured as separate gateways in the network architecture of FIG. 1, the two gateways may be implemented according to a single gateway configuration option.

The MME performs signaling and control functions to support access of a UE for network connection, network resource allocation, tracking, paging, roaming and handover. The MME controls control plane functions related to subscriber and session management. The MME manages a large number of eNodeBs and performs signaling for selection of a typical gateway for handover to another 2G/3G network. In addition, the MME performs security procedures, terminal-to-network session handling, idle terminal location management, etc.

The SGSN handles all packet data such as mobility management and authentication of a user for another 3GPP network (e.g., GPRS network).

The ePDG serves as a security node for an untrusted non-3GPP network (e.g., I-WLAN, Wi-Fi hotspot, etc.).

As described above in relation to FIG. 1, an IP-capable UE may access an IP service network (e.g., IMS) provided by an operator, via various elements in the EPC based on non-3GPP access as well as 3GPP access.

FIG. 1 also illustrates various reference points (e.g., S1-U, S1-MME, etc.). In the 3GPP system, a conceptual link connecting two functions of different functional entities of E-UTRAN and EPC is defined as a reference point. Table 1 lists the reference points illustrated in FIG. 1. In addition to the examples of Table 1, various reference points may be present according to network architectures.

TABLE 1

| Reference Point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |

TABLE 1-continued

| Reference Point | Description |
| --- | --- |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points illustrated in FIG. 1, S2a and S2b correspond to non-3GPP interfaces. S2a is a reference point for providing a user plane with related control and mobility support between the trusted non-3GPP access and the PDNGW. S2b is a reference point for providing a user plane with related control and mobility support between the ePDG and the PDNGW.

Figure 2:
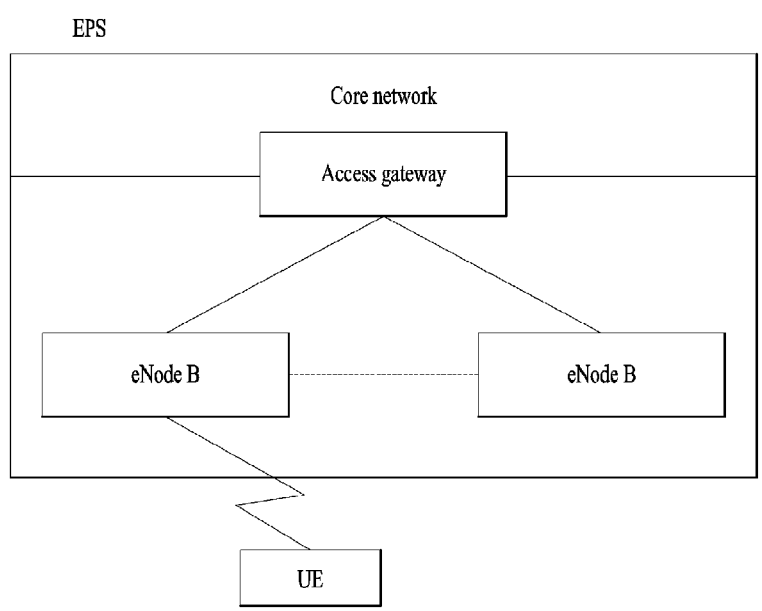
FIG. 2 is a schematic diagram of a structure of E-UTRAN (evolved universal terrestrial radio access network) connected to EPC as an example of a wireless communication system.

FIG. 2 is a schematic diagram of a structure of E-UTRAN connected to EPC as an example of a wireless communication system. An evolved packet system (EPS) is an evolved version of the conventional universal mobile telecommunications system (UMTS), and its basic standardization is in progress under the 3GPP. The EPS may be referred to as an LTE (long term evolution) system. Details of the technical specifications of the UMTS and EPS may be understood with reference to Release 7 and Release 8 of "3rd Generation Partnership Project; Technical Specification Group Radio Access Network".

Referring to FIG. 2, the EPS includes a user equipment (UE), eNodeBs (eNBs), and an access gateway (AG) which is located at an end of a network (E-UTRAN) and connected to an external network. The eNBs may simultaneously transmit multiple data streams for a broadcast service, a multicast service and/or a unicast service.

One or more cells exist for one eNB. One cell is set to one of bandwidths of 1.25, 2.5, 5, 10, 15 and 20 MHz to provide a downlink or uplink transport service to several UEs. Different cells may be set to provide different bandwidths. Also, one eNB controls data transmission and reception for a plurality of UEs. The eNB transmits downlink (DL) scheduling information of downlink data to the corresponding UE to notify the corresponding UE of time and frequency domains to which data will be transmitted and information related to encoding, data size, and hybrid automatic repeat and request (HARQ). Also, the eNB transmits uplink (UL) scheduling information of uplink data to the corresponding UE to notify the corresponding UE of time and frequency domains that can be used by the corresponding UE, and information related to encoding, data size, and HARQ. An interface for transmitting user traffic or control traffic may be used between the eNBs. A Core Network (CN) may include the AG and a network node or the like for user registration of the UE. The AG manages mobility of the UE on a Tracking Area (TA) basis, wherein one TA includes a plurality of cells.

Although the wireless communication technology has been evolved based on WCDMA into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the UE, etc. are required.

Recently, standardization of advanced technology of LTE is in progress under the 3GPP. In this specification, the above technology will be referred to as 'LTE-A'. The LTE-A system aims to support a wideband of maximum 100 MHz. To this end, the LTE-A system uses a carrier aggregation (CA) technique that achieves a wideband using a plurality of frequency blocks. According to the CA, a plurality of frequency blocks are used as one great logical frequency band for wider frequency bandwidth. A bandwidth of each frequency block may be defined based on a bandwidth of a system block used in the LTE system. Each frequency block may be referred to as a component carrier (CC) or a cell.

Figure 3:
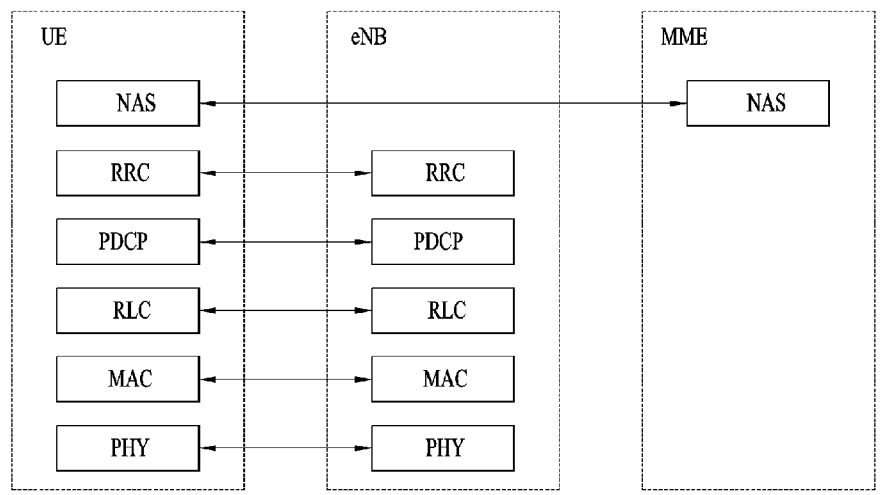
FIG. 3 is a diagram for structures of control and user planes of a radio interface protocol between a UE and E-UTRAN based on 3GPP radio access network standard.
Figure 3:
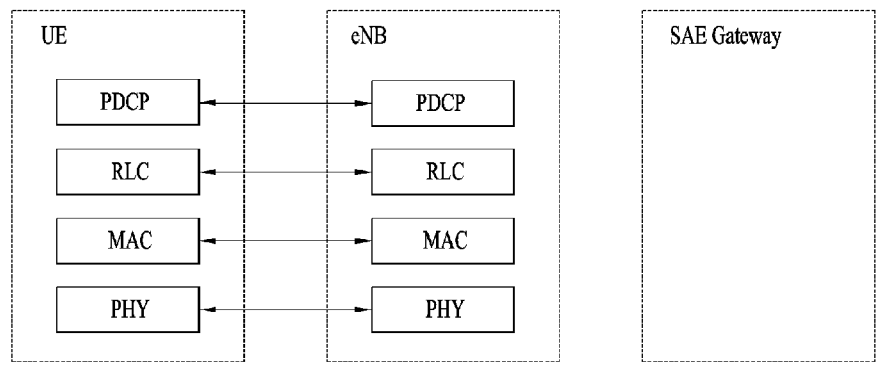

FIG. 3 is a diagram illustrating structures of a control plane and a user plane of a radio interface protocol between a UE and E-UTRAN based on the 3GPP radio access network standard. The control plane means a passageway where control messages are transmitted, wherein the control messages are used by the UE and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, reconfiguration and release of radio bearers to be in charge of controlling the logical, transport and physical channels. In this case, the radio bearer means a service provided by the second layer for the data transfer between the UE and the network. To this end, the RRC layers of the UE and the network exchange an RRC message with each other. If there is an RRC connection between the RRC layer of the UE and the RRC layer of the network, the UE is in an RRC connected mode. If not so, the UE is in an RRC idle mode. A non-access stratum (NAS) layer located above the RRC layer performs functions such as session management and mobility management.

One cell constituting an eNB is set to one of bandwidths of 1.25, 2.5, 5, 10, 15, and 20 MHz and provides a downlink or uplink transmission service to several UEs. At this time, different cells may be set to provide different bandwidths.

As downlink transport channels carrying data from the network to the UE, there are provided a broadcast channel (BCH) carrying system information, a paging channel (PCH) carrying paging messages, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the UE to the network, there are provided a random access channel (RACH) carrying an initial control message and an uplink shared channel (SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 4:
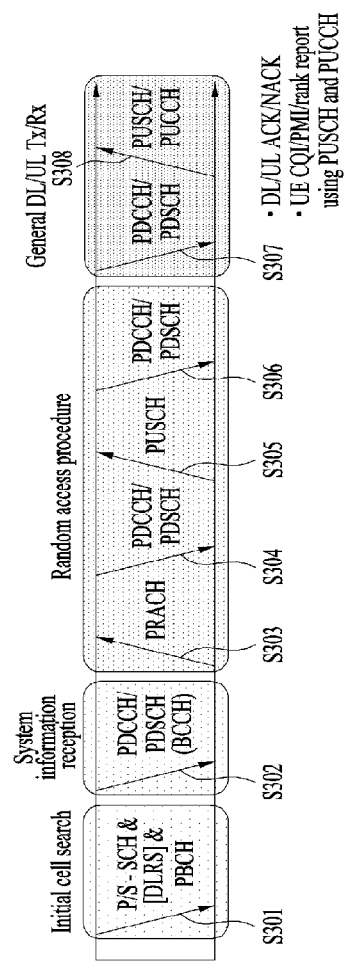
FIG. 4 is a diagram of physical channels used in 3GPP system and a general signal transmission method using the same.

FIG. 4 is a diagram illustrating physical channels used in 3GPP LTE system and a general signal transmission method using the physical channels.

If a UE enters a new cell or power is turned on, the UE performs an initial cell search operation such as synchronizing with an eNB [S301]. To this end, the UE synchronizes with the eNB by receiving a primary synchronization channel (P-SCH) and a secondary synchronization channel (S-SCH) from the eNB, and acquires information such as cell ID, etc. Afterwards, the UE may acquire intra-cell broadcast information by receiving a physical broadcast channel (PBCH) from the eNB. Meanwhile, the UE may check a downlink channel state by receiving a downlink reference signal (DL RS) at the initial cell search step.

Having completed the initial cell search, the UE may acquire more detailed system information by receiving a physical downlink control channel (PDCCH) and a physical downlink shared channel (PDSCH) in accordance with information carried on the PDCCH [S302].

Meanwhile, if the UE initially accesses the eNB or if there is no resource for signal transmission, the UE may perform a random access procedure with respect to the eNB [S303 to S306]. To this end, the UE may transmit a specific sequence as a preamble through a physical random access channel (PRACH) [S303 and S305] and may receive a response message through PDCCH and corresponding PDSCH in response to the preamble [S304 and S306]. In case of a contention based RACH, an additional contention resolution procedure can be performed.

Having performed the aforementioned steps, the UE may perform PDCCH/PDSCH reception [S307] and PUSCH/PUCCH (physical uplink shared channel/physical uplink control channel) transmission [S308] as a general procedure of transmitting uplink/downlink signals. Particularly, the UE receives downlink control information (DCI) through the PDCCH. In this case, the DCI includes control information such as resource allocation information on a UE and can differ in format in accordance with the purpose of its use.

Meanwhile, control information transmitted/received in uplink/downlink to/from the eNB by the UE includes ACK/NACK signal, CQI (channel quality indicator), PMI (precoding matrix index), RI (rank indicator) and the like. In the case of the 3GPP LTE system, the UE is able to transmit the above-mentioned control information such as CQI, PMI, RI and the like through PUSCH and/or PUCCH.

Figure 5:
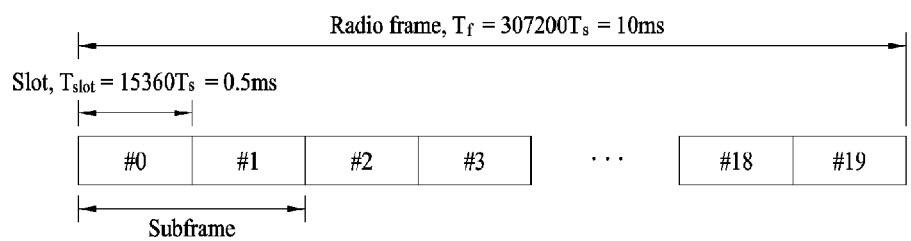
FIG. 5 is a diagram for a structure of a radio frame used in LTE system.

FIG. 5 is a diagram for a structure of a radio frame used in LTE system.

Referring to FIG. 5, a radio frame has a length of 10 ms ($327200 \times T_s$) and is constructed with 10 subframes in equal size. Each of the subframes has a length of 1 ms and is constructed with two slots. Each of the slots has a length of 0.5 ms ($15360 \times T_s$). In this case, $T_s$ indicates a sampling time and is expressed as $T_s = 1/(15 \text{ kHz} \times 2048) = 3.2552 \times 10^{-8}$ (about 33 ns). The slot includes a plurality of OFDM symbols in a time domain and includes a plurality of resource blocks (RB) in a frequency domain. In the LTE system, one resource block includes '12 subcarriers×7 or 6 OFDM symbols'. A transmission time interval (TTI), which is a unit time for transmitting data, can be determined as at least one subframe unit. The above-described structure of the radio frame is just exemplary. And, the number of subframes included in a radio frame, the number of slots included in a subframe and/or the number of OFDM symbols included in a slot can be changed in various ways.

In case of a normal cyclic prefix, one subframe may include 14 OFDM symbols. First 1 to 3 OFDM symbols may be used as a control region and the rest of 13 to 11 OFDM symbols may be used as a data region in accordance with a subframe configuration. Control channels assigned to the control region may include PCFICH (physical control format indicator channel), PHICH (physical hybrid-ARQ indicator channel), PDCCH (physical downlink control channel) and the like.

PDCCH is a physical downlink control channel and is assigned to first n OFDM symbols of a subframe. In this case, 'n' is an integer equal to or greater than 1 and is indicated by PCFICH. The PDCCH informs each UE or UE group of resource allocation information on PCH (paging channel) and DL-SCH (downlink-shared channel) corresponding to transport channels, uplink scheduling grant, HARQ information and the like. The PCH (paging channel) and the DL-SCH (downlink-shared channel) are transmitted through the PDSCH. Therefore, an eNB or a UE normally transmits or receives data through the PDSCH except specific control information or specific service data.

Information indicating which UE (one or a plurality of UEs) receives data of PDSCH, information indicating how the UEs receive and decode PDSCH data, and the like are transmitted by being included in the PDCCH. For instance, it is assumed that CRC masking is performed on a specific PDCCH with RNTI (radio network temporary identity) 'A' and that information on data to be transmitted using a radio resource 'B' (e.g., frequency position) and DCI format 'C' i.e., transmission format information (e.g., transport block size, modulation scheme, coding information, etc.) is transmitted in a specific subframe. If so, a UE in a cell monitors PDCCH, i.e., performs blind decoding on PDCCH, using RNTI information of its own. If there is at least one UE having the RNTI 'A', the UEs receive the PDCCH and then receive PDSCH indicated by 'B' and 'C' through the information of the received PDCCH.

Moreover, an uplink subframe may be divided into a region to which PUCCH (physical uplink control channel) carrying control information is assigned and a region to which PUSCH (physical uplink shared channel) carrying user data is assigned. A middle part of a subframe is assigned for the PUSCH and both side parts of a data region in frequency domain are assigned for the PUSCH. The control information carried on the PUCCH may include ACK/NACK used for HARQ, CQI (channel quality indicator) indicating a downlink channel state, RI (rank indicator) for MIMO, SR (scheduling request) that is an uplink resource allocation request, and the like.

Relay

A relay may be introduced for the purposes of expansion of fast data rate coverage, enhancement of group mobility, a temporary network arrangement, improvement in throughput at a cell boundary throughput, and introduction of network coverage for a new area.

Figure 6:
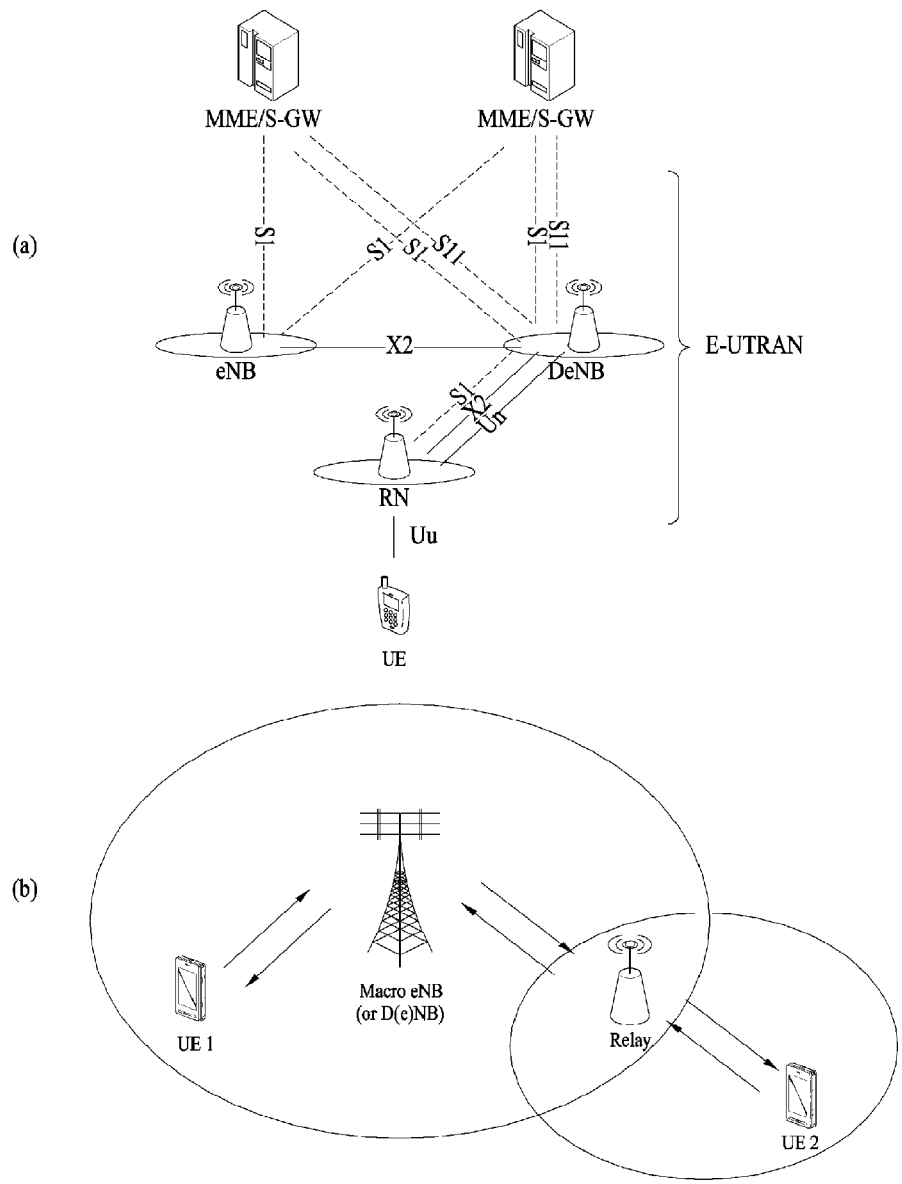
FIG. 6 is a diagram for a schematic structure of E-UTRAN supporting a relay.

FIG. 6 is a diagram for a schematic structure of E-UTRAN supporting a relay.

The matters mentioned in the foregoing description with reference to FIG. 1 can be equally applied to a reference point between MME/S-GW and an (e)NB (or a donor (e)NB) in FIG. 6(a).

A relay node (RN) forwards data transmitted or received between an (e)NB and a UE and two types of links (i.e., backhaul link and access link) having different attributes are applied to carrier frequency bands, respectively. A backhaul link is the link between the relay and the (e)NB (e.g., donor eNB (D(e)NB)) and includes X2 and/or Un reference point. An access link is the link between the relay and the UE and includes Uu reference point. The relay may access a network through the D(e)NB and there may be S1 reference point between the D(e)NB and the relay node.

The relay (RN) operates as a UE (i.e., relay type of UE) for the D(e)NB and operates as an (e)NB for the UE served by the RN. Several additional functions are required for the D(e)NB to provide a service to the RN. In case that the RN accesses the D(e)NB, the D(e)NB may provide information necessary for the RN and system information through a dedicated signaling by performing a reconfiguration.

As shown in FIG. 6 (b), a macro eNB is an eNB that serves UE1 and may perform communication with the UE1 through transmission to the UE1 in downlink and reception from the UE1 in uplink. On the other hand, the macro eNB performs functions as a D(e)NB with respect to a relay. Communication between the D(e)NB and the relay is performed through backhaul downlink and backhaul uplink and communication between the relay and UE2 is performed through access downlink and access uplink.

Functions of uplink reception and downlink transmission are necessary for an eNB and functions of uplink transmission and downlink reception are necessary for a UE. On the other hand, a function of backhaul UL transmission to an eNB, a function of access UL reception from a UE, a function of backhaul DL reception from an eNB and a function of access DL transmission to a UE are necessary for a relay.

Meanwhile, regarding the use of a band (or spectrum) of the relay, its operation can be classified as 'in-band' and 'out-band'. For an in-band RN, a backhaul link operates on the same frequency band as that of an access link. If the backhaul link and the access link operate in different frequency bands, the RN is an out-band RN. In both of the in-band and out-band, it is necessary for a UE (or a legacy UE) operating in the conventional LTE system (e.g., Release-8) to be able to access a donor cell.

In order for the relay to operate in in-band, prescribed resources in time-frequency space must be reserved for the backhaul link and these resources may be configured not be used for the access link. This configuration is called 'resource partitioning'.

The general principles related to the resource partitioning in a relay may be described as follows. First of all, a backhaul downlink and an access downlink may be multiplexed together on a single carrier frequency by a time division multiplexing (TDM) scheme (i.e., either the backhaul downlink or the access downlink is activated in specific time). Similarly, a backhaul uplink and an access uplink may be multiplexed together on a single carrier frequency by the TDM scheme (i.e., either the backhaul uplink or the access uplink can be activated in specific time).

In case of an in-band relay, for example, if backhaul downlink reception from an eNB and access downlink transmission to a UE are simultaneously performed on a prescribed frequency band, a signal transmitted from a transmitting end of a relay may be received by a receiving end of the relay, whereby signal interference or RF jamming may occur at an RF front-end of the relay. Similarly, if access uplink reception from the UE and backhaul uplink transmission to the eNB is simultaneously performed on a prescribed frequency band, signal interference may occur at the RF front-end of the relay. Therefore, it may be difficult to implement the simultaneous transmission and reception on a single frequency band at a relay unless a sufficient separation between a received signal and a transmitted signal is provided (e.g., a transmitting antenna and a receiving antenna are installed in a manner of being sufficiently spaced apart from each other (e.g., installed on or under the ground)).

Figure 7:
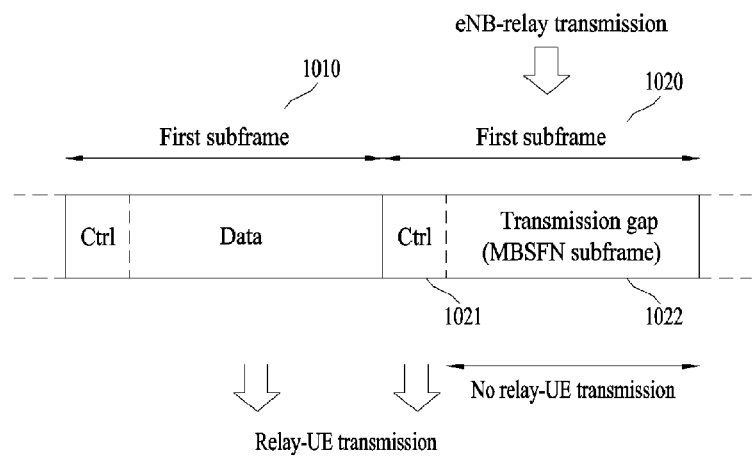
FIG. 7 is a diagram of resource partitioning with respect to a relay.

As a solution for the above-mentioned signal interference problem, a relay may not transmit a signal to a UE while receiving a signal from a donor cell. In particular, a gap is generated in transmission from the relay to the UE and the UE (including the legacy UE) may be configured not to expect any transmission from the relay during this gap. Referring to FIG. 7, in a first subframe 1010 corresponding to a normal subframe, a downlink (i.e., an access downlink) control signal and data are transmitted from a relay to a UE. In case of a second subframe 1020 corresponding to an MBSFN (multicast broadcast single frequency network) subframe, a control signal is transmitted from the relay to the UE in a control region 1021 of the downlink subframe but any signal or data is not transmitted from the relay to the UE in the rest region 1022 of the downlink subframe. In doing so, since a legacy UE expects transmission of physical downlink control channel (PDCCH) in all downlink subframes (i.e., since the relay needs to support legacy UEs within coverage of the relay to receive PDCCH in each subframe and to perform a measurement function thereof), it is necessary for the PDCCH to be transmitted in all the downlink subframes in order for each legacy UE to operate correctly. Therefore, in a subframe (i.e., the second subframe 1020) configured for downlink (i.e., backhaul downlink) transmission from the eNB to the relay, the relay needs to perform access downlink transmission in first N OFDM symbols (N=1, 2 or 3) rather than to receive backhaul downlink. To this end, since PDCCH is transmitted from the relay to the UE in the control region 1021 of the second subframe, it may provide backward compatibility with the legacy UE served by the relay. While no signal is transmitted from the relay to the UE in the rest region 1022 of the second subframe, the relay may receive transmission from the eNB. Therefore, the above-mentioned resource partitioning scheme can prevent the access downlink transmission and the backhaul downlink reception from being simultaneously performed by the in-band relay.

The second subframe 1022, which uses the MBSFN subframe, shall be described in detail as follows. In principle, the MBSFN subframe is a subframe for multimedia broadcast and multicast service (MBMS) and the MSMS means a service that a plurality of cells transmit the same signal at the same time. The control region 1021 of the second subframe may be referred to as a relay non-hearing interval. In particular, the relay non-hearing interval may mean an interval in which a relay transmits an access downlink signal instead of receiving a backhaul downlink signal. As mentioned in the foregoing description, this relay non-hearing interval may be configured to have 1-, 2- or 3-OFDM length. The relay performs access downlink transmission to the UE in the relay non-hearing interval 1021 and may receive backhaul downlink from the eNB in the rest region 1022. In doing so, since the relay is unable to perform both transmission and reception on the same frequency band, it may take a time to enable the relay to be switched from a transmitting mode to a receiving mode. Hence, it may be necessary to configure a guard time (GT) to enable the relay to perform transmitting/receiving mode switching in first partial interval of a backhaul downlink receiving region 1022. Similarly, even if the relay operates in a manner of receiving backhaul downlink from the eNB and transmitting access downlink to the UE, it may configure the guard time (GT) for the transmitting/receiving mode switching of the relay. The length of the guard time may be defined as a value in time domain. For example, the length of the GT may be defined as k time samples (Ts) (where, k≥1) or may be set to the length of at least one or more OFDM symbols. Alternatively, in case that backhaul downlink subframes of the relay are contiguously configured or in accordance with a prescribed subframe timing alignment relation, the guard time of a last part of a subframe may be defined or may not configured. In order to maintain backward compatibility, this guard time may be defined only in a frequency domain configured for backhaul downlink subframe transmission. (i.e., if a guard time is configured in an access downlink interval, the legacy UE cannot be supported.) In the backhaul downlink reception interval 1022 except the guard time, the relay may receive PDCCH and PDSCH from the eNB. Particularly, to discriminate the PDCCH transmitted from the eNB to the relay in a data region of the backhaul downlink subframe from the conventional PDCCH, it may be referred to as R-PDCCH (relay-PDCCH).

Meanwhile, a mobile relay is the relay that relays signal transmission and reception between a macro eNB and a UE, similar to a general relay, but is not fixed in a prescribed location. An example of the mobile relay includes a relay installed in a transportation means (e.g., a vehicle, a bus, a train, etc.) or a UE with mobility that performs a function of relaying with respect to another UE. If the mobile relay is introduced, a relay and a UE served by the relay may move together. In particular, since the movement of the relay may cause change of an eNB (e.g., D(e)NB), which serves the relay, mobility of the relay needs to be secured.

Proximity Service (ProSe)

The present invention proposes a control mechanism for supporting a proximity service (ProSe) or a D2D service in a mobile communication system such as 3GPP EPS (evolved packet system).

Recently, demands for detection/discovery between physically adjacent users/devices and special applications/services (e.g., proximity-based applications/services) have appeared due to increase in user demands related to social network service (SNS) and the like. In a 3GPP mobile communication system, potential use cases and scenarios of the ProSe and potential service requirements to provide such service are under discussion.

The potential use cases of the ProSe may include commercial/social service, network offloading, public safety, integration of current infrastructure services (to assure the consistency of the user experience including reachability and mobility aspects). In addition, use cases and potential requirements for public safety in the case of absence of EUTRAN coverage are under discussion (in this case, they should match regulations with respect to a specific area and polices on service providers and be also limited to specific frequency bands and specific user equipments designated for public safety).

Particularly, in the scope of discussion with respect to the ProSe in the 3GPP, it is assumed that proximity-based applications/services are provided via LTE or WLAN and that discovery and communication are performed between devices under the control of a service provider/network.

Figure 8:
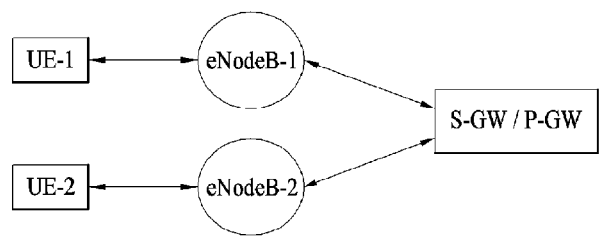
FIG. 8 is a diagram of a default data path for communication between two UEs in EPS.

FIG. 8 is a diagram of a default data path for communication between two UEs in EPS. In other words, FIG. 8 illustrates a data path between UE-1 and UE-2 in a general case, i.e., ProSe between UE-1 and UE-2 is not applied. Such a default path goes through a base station (e.g., eNodeB or Home eNodeB) and gateway nodes (e.g., EPC or a service provider network). For example, as shown in FIG. 8, when UE-1 and UE-2 exchange data with each other, data of UE-1 may be transmitted to UE-2 through eNodeB-1, S-GW/P-GW, and eNodeB-2 and, likewise, data of UE-2 may be transmitted to UE-1 through eNodeB-2, S-GW/P-GW, and eNodeB-1. Although it is illustrated in FIG. 8 that UE-1 and UE-2 are camped on different eNodeBs, UE-1 and UE-2 may be camped on the same eNodeB. In addition, although it is illustrated in FIG. 8 that the two UEs are served by the same S-GW and P-GW, various combinations of services are allowed here. In particular, the UEs may be served by the same S-GW and different P-GWs, by different S-GWs and the same P-GW, or by different S-GWs and different P-GWs.

In the present invention, the default data path may be referred to as an infrastructure path, infrastructure data path or infrastructure communication path. In addition, communication through the infrastructure data path may be referred to as infrastructure communication.

Figure 9:
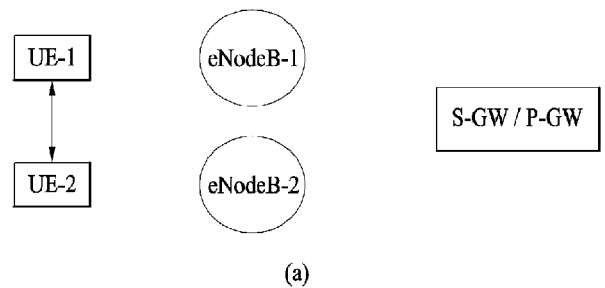
FIG. 9 is a diagram of a direct mode data path between two UEs on the basis of ProSe.
Figure 9:
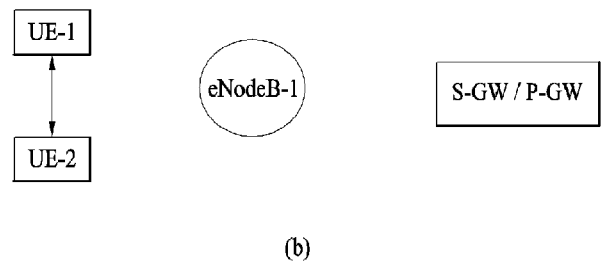

FIG. 9 is a diagram of a direct mode data path between two UEs on the basis of ProSe. Such a direct mode data path does not go through a base station (e.g., eNodeB or Home eNodeB) and gateway nodes (e.g., EPC).

FIG. 9(*a*) illustrates a case that UE-1 and UE-2 are camped on different eNodeBs (e.g., eNodeB-1 and eNodeB-2) and exchange data with each other through a direct mode data path. FIG. 9(*b*) illustrates a case that UE-1 and UE-2 are camped on the same eNodeB (e.g., eNodeB-1) and exchange data with each other through a direct mode data path.

It should be noted that a data path of a user plane is directly established between UEs without going through a base station or a gateway node as shown in FIG. 9 but a control plane path can be established by going through a base station and a core network. Control information exchanged through the control plane path may be information on session management, authentication, authorization, security, charging and the like. In the case of ProSe communication between the UEs served by different eNodeBs as illustrated in FIG. 9(a), control information on UE-1 may be exchanged through eNodeB-1 with a control node (e.g., MME) of a core network. And, control information on UE-2 may be exchanged through eNodeB-2 with the control node (e.g., MME) of the core network. In the case of ProSe communication between the UEs served by the same eNodeB as illustrated in FIG. 9(b), control information on UE-1 and UE-2 may be exchanged through eNodeB-1 with a control node (e.g., MME) of a core network.

Figure 10:
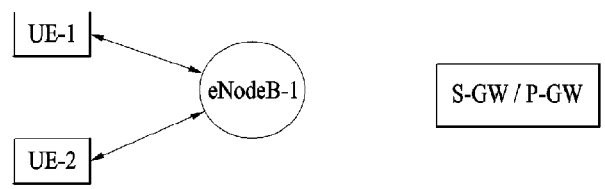
FIG. 10 is a diagram of a locally-routed data path between two UEs on the basis of ProSe.

FIG. 10 is a diagram of a locally-routed data path between two UEs on the basis of ProSe. As illustrated in FIG. 10, a ProSe communication data path between UE-1 and UE-2 is established by going through eNodeB-1 but does not go through a gateway node (e.g., EPC) operated by a service provider. On the other hand, in the case of a control plane path, if a locally-routed data path is established between UEs served by the same eNodeB as illustrated in FIG. 10, control information on UE-1 and UE-2 may be exchanged through eNodeB-1 with a control node (e.g., MME) of a core network.

In the present invention, the data path mentioned in the foregoing description with reference to FIGS. 9 and 10 may be referred to as a direct data path, data path for ProSe, ProSe-based data path or ProSe communication path. In addition, communication through the direct data path may be referred to as direct communication, ProSe communication or ProSe-based communication.

UE-Relay Technology

Figure 11:
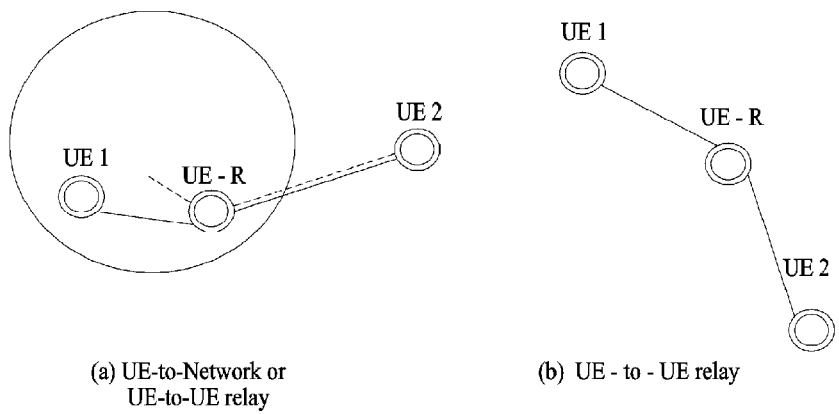
FIG. 11 is a diagram to describe two types of a UE-relay.

FIG. 11 is a diagram to describe two types of a UE-relay.

FIG. 11(a) illustrates a case that UE-R (UE-relay) is in coverage of E-UTRAN and FIG. 11(b) illustrates a case that UE-R is out of coverage of E-UTRAN.

The UE-R illustrated in FIG. 11(a) may belong to a UE-to-network relay type (i.e., a communication path shown in dotted line) or a UE-to-UE relay type (i.e., a communication path shown in solid line). The UE-R illustrated in FIG. 11(b) belongs to the UE-to-UE relay type only. The UE-to-UE relay means that a UE-R relays communication between two UEs in case that the two UEs communicate with each other directly. And, the UE-to-network relay means that a UE-R relays communication between a UE and a network node (e.g., (e)NB).

In order for a UE to operate as a relay, the UE requires additional power consumption compared to a case in which the UE operates as a simple UE. Particularly, the additional power consumption is necessary to perform a relay communication operation (i.e., an operation of relaying communication between two different entities), an operation of monitoring a UE in need of a relay, a relay capability announcement operation and the like.

In 3GPP standardization, a UE-relay activation type has been discussed. So far, the use of a UE-relay for only public safety has been defined. However, it is expected that discussion on a method of applying the UE-relay to provide other services besides public safety will be made through a standardization process. In the following description, the UE-relay activation type which has been discussed so far will be explained.

A public safety ProSe UE with relaying capability may be configured to operate as a UE-relay in order to extend a range of communication for public safety and it can operates as either the UE-to-UE relay or the UE-to-network relay. To this end, a relay discovery function and a relay public safety ProSe communication function may be used.

If a UE operates as a UE-relay, the UE-relay may consume additional power for a relay discovery process and relay communication. Due to limited capacity of a battery, a relay function of the UE-relay should be activated only in case of need. To this end, three activation types are defined.

Activation Type 1 (relay discovery is not performed): Whenever a public safety UE has a source UE and an activated public safety ProSe communication, the relay function can be activated. This activation type of a relay may unnecessarily consume power in case of no public safety UE in need of the relay for communication. Therefore, this activation type is suitable for emergency communication or high priority of communication.

Activation Type 2 (UE-relay operates as a monitoring UE for relay discovery): In case that an announcement message is received from a UE that requests discovery of a public safety relay, the relay function can be activated. A UE-relay should monitor relay discovery by periods in order to activate/deactivate its relay function immediately at any time in case that there is an activated public safety ProSe communication. The relay discovery for the UE, which requests the relay (i.e. transmits the announcement message), may be periodically triggered. Alternatively, it may be trigged in case of losing the activated public safety ProSe communication by being out of a range of communication with the source UE.

Activation Type 3 (UE-relay operates as a UE for transmitting an announcement in relay discovery): In case that an acknowledgement message is received from a UE that requests discovery of a public safety relay, the relay function of a UE-relay can be activated. Whenever there is an activated public safety ProSe communication, the UE-relay should periodically transmit a relay discovery announcement message in order to inform its existence. If there is no adjacent public safety UE, this activation type of the UE-relay may consume unnecessary power.

It should be noted that a public safety UE set to a UE-relay needs to perform the relay discovery process by periods, irrespective of the activation type 2 of a monitoring UE or the activation type 3 of an announcing UE. Thus, the UE-relay can determine whether to deactivate the relay function for the public safety ProSe communication in case that there is no public safety UE within its relay communication range.

Method of Configuring Relay Functionality

The present invention proposes a method of configuring relay functionality of a UE-relay. Particularly, proposed is a method capable of minimizing battery consumption of a UE-relay, activating/deactivating a relay function rapidly depending on a network status, and configuring or adjusting conditions for performing the above operations. The relay functionality of a UE includes a discovering operation before performing communication as a UE-relay or an announcing operation for another UE to discover the UE-relay.

As mentioned in the foregoing description, UE-relays can be classified into a UE-to-network relay type and a UE-to-UE relay type. For relay communication, it is necessary to determine or select an optimized relay. A network may determine/select the relay or a UE may determine/select the relay autonomously.

Figure 12:
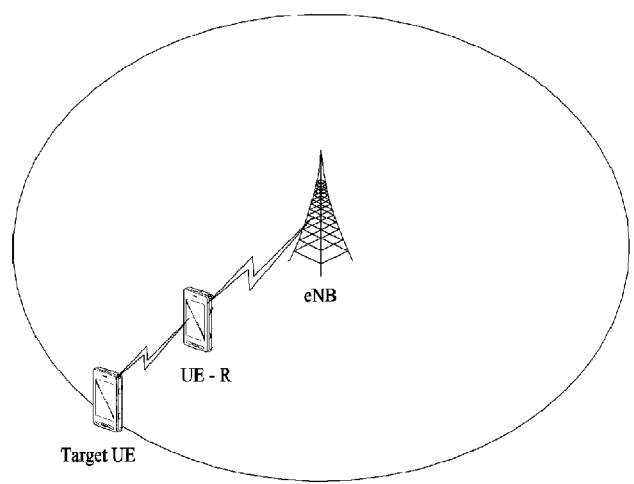
FIG. 12 is a diagram to describe a case of determining a UE operating as a UE-to-network relay.

FIG. 12 is a diagram to describe a case of determining a UE operating as a UE-to-network relay.

First of all, a case in which a network determines or selects a UE-relay is described with reference to the example in FIG. 12.

In the example of FIG. 12, if a target UE is out of coverage of an eNB or if link quality (or signal strength) between the target UE and the eNB is maintained below a prescribed level (e.g., radio link failure (RLF)), a network (e.g., eNB) may determine/select an suitable UE and then operate the determined/selected UE as a relay for the target UE. In this case, based on link quality (or signal strength) of a link (or access link) between the target UE and a UE-relay and/or link quality (or signal strength) of a link (or backhaul link) between the UE-relay and the network, the network may select the UE operating as the UE-relay from candidate UE(s). In this case, the link quality (or signal strength) corresponding to reference of determining/selecting the UE-relay may be most significantly affected by a location of the UE-relay.

Moreover, the network should know locations of the candidate UE(s), signal strength of each of the candidate UE(s) and the like in order to select the UE-relay. Thus, a UE in connected mode with the network may become the candidate UE. In particular, since the network is unable to know a location or signal strength of a UE in idle mode, the corresponding UE cannot become the candidate UE. However, in case that the UE in connected mode performs a role of the relay, it may highly cause delay or quality degradation in the relay communication since the UE in connected mode requires communication with the network in general. In addition, in case that the relay communication is priory performed, it may cause delay or quality degradation in communication for the UE-relay. Hence, in aspect of efficiency in the entire network, the UE in idle mode, which does not perform communication, may be considered suitable for the UE-relay.

Secondly, a case in which a UE determines or selects a UE-relay is described with reference to the example in FIG. 12.

In the example of FIG. 12, if the target UE is out of coverage of the network, the target UE may determine or select a suitable UE from adjacent UE(s) existing in the communication available range with the target UE and then communicate with the network according to the UE-to-network relay scheme. The target UE transmits a relay request signal to the adjacent UE(s) and may then determine/select a UE that responds to the relay request signal as the UE-relay. Alternatively, the target UE transmits the relay request signal to a UE announcing that it has relay capability and may then determine/select the corresponding UE as the UE-relay.

Figure 13:
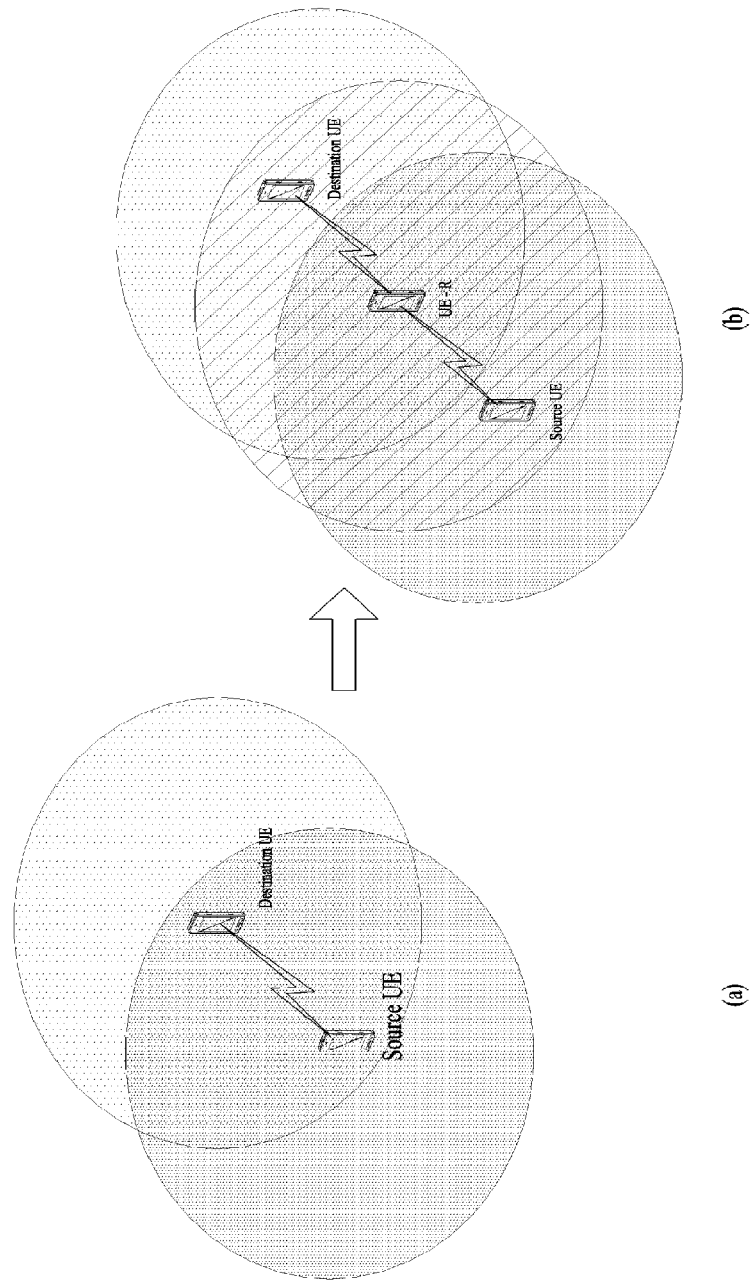
FIG. 13 is a diagram to describe a case of determining a UE operating as a UE-to-UE relay.

FIG. 13 is a diagram to describe a case of determining a UE operating as a UE-to-UE relay.

While a source UE and a destination UE performs direct communication as shown in FIG. 13(a), if the two UEs are out of a communication available range due to increase in distance between them as shown in FIG. 13(b), UE-to-UE relay communication between the source UE and the destination UE can be supported in a manner of operating an adjacent suitable UE as a UE-relay.

In case that a network determines/selects the UE-relay for the UE-to-UE relay communication, if the source UE and the destination UE are served by different eNBs, the source UE and the destination UE should be in connected mode with the eNBs, respectively. Moreover, each of the eNBs should also know a location of each of the source UE and the destination UE. Furthermore, a complex signaling may be required since the locations of the UEs should be shared between the eNBs.

In the case of UE-to-network relay scheme in FIG. 12 or UE-to-UE relay scheme in FIG. 13, when a UE determines/selects a relay autonomously, relay capable UE(s) should monitor a relay request transmitted from the source UE or the destination UE or announce its relay capability to adjacent UEs.

In addition, although a UE in connected mode may be able to monitor a relay request from a different UE or announce its relay capability while performing communication with the network, a UE in idle mode needs to perform a monitoring of the relay request or an announcement of the relay capability by waking up from idle mode at every prescribed time interval.

Thus, even if the relay capable UE does not need to operate as the relay, the relay capable UE may perform operations of monitoring a relay request from a different UE or announcing its relay capability in order to support autonomous relay determination/selection of the different UE. Thus, it may cause unnecessary power consumption of the corresponding UE. Particularly, in the case of the UE in idle mode, since the UE should repeat transmission and reception operations after waking up from the idle mode, the problem of the unnecessary power consumption may become more serious. In addition, although a UE in need of the relay does not exist, since the relay capable UE is unable to know non-presence of the UE, there is a problem that the relay capable UE should maintain the unnecessary power consumption.

To solve the above-mentioned problems, the present invention proposes methods for minimizing power consumption of a UE.

First of all, in a situation that a UE-relay is unnecessary, a relay capable UE may operate to minimize the monitoring of a relay request and the relay capability announcement transmission. For instance, after examining whether a network needs the UE-relay, if the relay capable UE determines that the UE-relay is unnecessary, the relay capable UE may deactivate its relay function. Alternatively, a method of extending a period for the relay capable UE to perform the monitoring of the relay request and/or the relay capability announcement transmission may be applied.

Secondly, a method for a network to discover an optimized UE-relay may be applied. For instance, by defining an operation for enabling the network to determine/select the optimized UE-relay for a UE in need of the UE-relay, efficiency of the entire network can be improved.

In the following description, a method for a network to perform triggering (or initiating) and a method for a UE to perform triggering (or initiating) will be explained in detail with regard to the methods proposed in the present invention.

Triggering Method by Network

In case of UE-relay determination/selection made by the lead (or assistance) of a network (e.g., eNB), if link quality (or signal strength) of a UE served by the corresponding network is degraded, the network may determine that relay communication is needed. Thus, the network may perform an operation of discovering or searching for a suitable UE.

To this end, the network may include information indicating that a UE-relay is needed in a dedicated message (e.g., paging message) or a broadcast signal (e.g., information provided through SIB (system information block)) in order to wake up UE(s) in idle mode (i.e., candidate UE(s) to be selected as the UE-relay), which are located in an area adjacent to a target UE. Additionally or alternatively, the network may include the information indicating that the UE-relay is needed in the dedicated message (e.g. paging message) or the broadcast signal in order to wake up UE(s) in the idle mode (i.e., candidate UE(s) to be selected as the UE-relay) located in an area in which link quality (or signal strength) of a link (or access link) between the target UE and the selected UE-relay and/or link quality (or signal strength) of a link (or backhaul link) between the selected UE-relay and the network can be maintained equal to or greater than a prescribed level. If a UE (i.e., UE-relay candidate) receives the dedicated message (e.g., paging message) or the broadcast signal, the UE may operate as the UE-relay or report its status to the network.

In addition, the network may include information indicating a desired location of the UE-relay in the dedicated message (e.g., paging message) or the broadcast signal. The desired location may correspond to a location of the UE relay in which optimized link quality (or signal strength) for relay communication is expected to be maintained. A UE (i.e., UE-relay candidate) that receives the dedicated message (e.g., paging message) or the broadcast signal may operate as the UE-relay or report its status to the network only if a location of the corresponding UE is adjacent to or equal to the desired location.

Moreover, if the target UE recognizes degradation of its link quality (or signal strength), the target UE may transmit its location information to the network. Thus, the network determines an optimized location of the UE-relay based on locations around the target UE or a location of the target UE and then transmit the dedicated message (e.g., paging message) or the broadcast signal for the UE-relay.

Furthermore, in order to enable a UE of which the link quality (or signal strength) of the link (or access link) between the target UE and the UE-relay and/or the link quality (or signal strength) of the link (or backhaul link) between the UE-relay and the network is greater than a prescribed threshold to operate as the UE-relay or to report its status to the network, information indicating a threshold for a link quality (or signal strength) may be included in the dedicated message (e.g., paging message) or the broadcast signal.

In the aforementioned examples, UE-relay candidate(s) may include a UE that is in connected mode and located around the target UE and a UE that receives the dedicated message (e.g., paging message) or the broadcast signal in idle mode. The UE-relay candidate(s) may report its status and/or capability information to the network (after accessing the network). After collecting information from the UE-relay candidate(s), the network may determine/select an optimized UE among the UE-relay candidates as a UE operating as the UE-relay. In this case, the optimized UE may be a UE expected to have the highest link quality (or signal strength) or a UE expected to have the best throughput performance in consideration of UE's load.

Additionally, the method for the network to trigger the UE-relay can be applied to a case of extending network coverage using the UE-relay. For instance, an eNB may understand the situation of a surrounding eNB (or cell) through O&M (Operation and Maintenance), an X2 signaling and/or an S1 message. For example, the eNB may obtain information on load of a surrounding cell, information on an activated/deactivated status, and/or related information. Thus, the eNB may determine whether its cell coverage needs to be extended. If determining that the cell coverage needs to be extended, the eNB may trigger UE-relay activation. Particularly, the eNB may activate a UE-relay separated by a predetermined distance or more from the center of the cell coverage (i.e., located adjacent to a cell boundary). In case that coverage extension in a specific direction is required, the eNB may select and activate a UE-relay located in the corresponding direction only. Moreover, if a surrounding eNB (or cell) operates normally or a new eNB (or cell) is activated, a coverage hole may disappear. In this case, the eNB may instruct the activated UE-relay to perform deactivation.

Further, the method for the network to trigger the UE-relay can be applied for IOPS (isolated E-UTRAN operation for public safety). The IOPS is a technology currently under discussion in 3GPP standardization and there are two examples included in an isolated E-UTRAN operation. The first example corresponds to a case in which a backhaul link between an eNB and a core network is disconnected. And, the second example corresponds to a case in which a specific eNB is set to a nomadic eNB for public safety. An eNB group, which includes at least one eNB, may constitute the nomadic eNB and an eNB (or cell) located at a boundary of the eNB group may activate a UE-relay to serve a UE located out of coverage.

Triggering Method by UE

When UE-relay determination/selection is autonomously triggered (or initiated) by a UE, since a network is aware of information related to coverage in the case of the UE-to-network relay, suitable information can be informed to the UE. For instance, if a neighboring cell (or cell) is deactivated or malfunctions, an eNB may determine that cell coverage needs to be extended. Subsequently, the corresponding eNB may transmit an activation command to a relay capable UE through a dedicated message (e.g., paging message) or a broadcast signal so that the relay capable UE monitors a relay request or announces its relay capability.

Since a UE located at the center of a cell has less probability of operating as a relay, the network may provide a UE with information on a threshold for a link quality (or signal strength) and/or information on a threshold for a distance together with enabling/activation information, in order to enable or activate a relay function when link quality (or signal strength) between the UE and the eNB is less than or equal to the prescribed threshold or when a distance between the UE and the eNB is equal to or greater than the prescribed threshold.

In addition, the network may provide the UE with information on a period of monitoring the relay request and/or performing the relay capability announcement. In case that the period indicated by the network is short, since the relay capable UE frequently performs the operation of monitoring the relay quest or announcing the relay capability, a UE in need of the relay may discover an optimized relay quickly. However, in this case, power consumption of the relay capable UE increases. On the contrary, in case that the period indicated by the network is long, since the relay capable UE rarely performs the operation of monitoring the relay quest or announcing the relay capability, the power consumption of the relay capable UE decreases. However, throughput performance of the entire network may be degraded since the UE in need of the relay takes a long time to discover the optimized relay. Therefore, by considering such a trade-off relationship, the network may set and provide the value of the period depending on the current situation (i.e., depending on whether the UE in need of the relay prioritizes to select the relay quickly or to operate by reducing the power consumption as much as possible).

Additionally, in case that a UE determines that the UE needs relay communication due to degradation of link quality (or signal strength) within coverage of the network, the UE reports information indicating it and may include information on its location in the above information. Thus, the UE induces the network to activate a UE-relay suitable for the corresponding UE.

Further, the relay capable UE may collect information related to the relay request (e.g., the number of UEs requesting the relay communication, location information of a corresponding UE, etc.), which is received (or monitored) by the corresponding relay capable UE in the vicinity. Subsequently, the relay capable UE may report the collected information to the network. Thus, the relay capable UE may enable the network to perform UE-relay activation control appropriately.

Parameter and Configuring Method for Relay Activation

In the following description, a method of defining and configuring parameters, which can be included in a signaling related to UE-relay activation (e.g., a dedicated message or a broadcast signal) by a network (e.g., eNB), is explained with reference to Table 2. For instance, an eNB may provide a UE with information indicating UE-relay activation only. Alternatively, the eNB may include at least one of the following parameters in the information.

greater than a prescribed threshold are configured to operate as the UE-relay only. Alternatively, in case that the link quality between the UE-relay and the network is less than the prescribed threshold, the threshold parameter may mean a value for instructing the UE-relay to perform an activation operation in determining that UEs around the UE-relay needs relay services. Further, UEs in specific locations may be activated as a UE-relay using the threshold parameter. For instance, if a threshold value is set to high, it is highly possible that UEs located adjacent to the center of a cell operate as a UE-relay (or perform an operation of announcing UE-relay capability). On the other hand, if the threshold value is set to low, UEs located adjacent to a cell boundary have a high probability of operating as the UE-relay (or performing the operation of announcing the UE-relay capability). Thus, an eNB determines a location in need of the relay based on at least one of presence or non-presence of a coverage hole in the cell, a location, a size of cell coverage, and a status of a neighboring cell. Thereafter, the eNB may configure the value of the threshold parameter so that UEs existing adjacent to the corresponding location performs the activation operation or the announcement operation as the UE-relay.

UEs located in a specific area of an eNB (or cell) can be activated as the UE-relay using the 'Location Information' parameter in Table 2. In case that the eNB, which serves the UEs, determines that a surrounding cell nearby a specific location is deactivated or malfunctions, the value of the location information parameter may be set in order to

TABLE 2

| Parameter Name | Description |
| --- | --- |
| Announcing Period | Period in which UE-relay performs an operation of announcing relay capability. (If this parameter value is omitted, a default announcing period can be used or a UE may arbitrarily configure an announcing period.) |
| Threshold | Threshold for signal strength. (If this parameter value is omitted, a default threshold can be used. Alternatively, it can be interpreted that UE-relay activation is indicated without consideration of the threshold.) |
| Location Information | Location of UE. A UE existing in an area determined based on this parameter value may be activated as a UE-relay. |

Regarding the 'Announcing Period' parameter in Table 2, in case of a long announcing period, power consumption of a UE may decrease. However, it may causes service disconnection to a different UE since the different UE takes a long time to discover a UE-relay. On the contrary, in case of a short announcing period, although power consumption of the UE increases, it is possible to maintain a service for the different UE or to provide a service to the different UE more rapidly since the different UE is able to discover the UE-relay quickly.

The announcing period may include a relay request monitoring period or the relay request monitoring period may be determined based on the announcing period. Moreover, since an announcing operation or a monitoring operation is performed according to an activation type of a relay, the announcing period can be expressed as an activation period of a relay for a common name.

The 'Threshold' parameter in Table 2 may be defined as, for example, reference signal received power (RSRP), reference signal received quality or the like. The threshold parameter may mean that UEs capable of maintaining link qualities between the UE-relay and the network equal to or instruct a UE adjacent to the corresponding surrounding cell to operate as the UE-relay (or to perform the operation of announcing the UE-relay capability). Moreover, in case that a specific UE informs the eNB that relay communication (or relay service) is needed, the eNB may set the value of the location information parameter in order to activate a UE, which exists at an optimized location between the corresponding specific UE and the eNB, as the UE-relay.

Although the above-mentioned examples of the present invention are explained with reference to the case in which the dedicated message transmitted to the UE (or UE-relay) by the eNB corresponds to the paging message, the scope of the present invention is not limited thereto. The examples of the present invention can be applied to different types of dedicated messages such as an attach response message, a tracking area update/routing area update (TAU/RAU) response message, etc., which are transmitted to a UE (or UE-relay) by an eNB.

In the following description, a method of defining and configuring parameters, which can be included in a signaling transmitted by a UE requesting relay communication (or relay service) to a network (e.g., eNB) is explained with reference to Table 3. For instance, the UE in need of the relay communication (or relay service) may simply transmit a signaling including only information for indicating the necessity. Alternatively, the UE may include at least one of the following parameters in the signaling.

TABLE 3

| Parameter Name | Description |
| --- | --- |
| Urgency | Value that indicates the degree of how much UE needs relay communication. |
| Location Information | Location information of UE. |
| Required Resource/Throughput | The amount of resources required by UE and/or required throughput. |

The 'Urgency' (or 'Exigency') parameter in Table 3 may be set as a value reflecting an application service in need of relay communication, a subscription class of a UE in need of relay communication, and the like. The value of this parameter may be used as a basis for an eNB to configure the period parameter, the threshold parameter, and the like included in a UE-relay activation signaling.

The 'Location Information' parameter in Table 3 means information on a location of a UE in need of the relay communication and the location of the UE can be expressed using GPS information and the like. The value of this parameter may be used as a basis for an eNB to configure the period parameter, the threshold parameter, and the like included in a UE-relay activation signaling.

The 'Required Resource/Throughput' parameter in Table 3 is a value indicating the amount of resources and/or throughput, which is required by the UE in need of the relay communication.

In the following description, a method of defining and configuring parameters, which can be included in a signaling transmitted by a candidate UE capable of supporting a UE-relay to a network (e.g., eNB) is explained with reference to Table 4. For instance, a UE-relay performing the relay communication (or relay service) or a relay capable UE may transmit a signaling that includes at least one of the following parameters.

TABLE 4

| Parameter Name | Description |
| --- | --- |
| Load Information | Value that indicates load of UE-relay. |
| Location Information | Location information of UE-relay. |
| Statistics of Relay Requesting UE | The number of UEs requesting relay communication or indication indicating an excess of prescribed threshold. |

The 'Load Information' parameter in Table 4 indicates the degree of load imposed on a UE-relay operating as a relay to process different communication (e.g., communication between the UE-relay and a network and/or relay communication provided by the UE-relay). If there are a number of relay capable UEs located adjacent to the UE requesting the relay communication (or relay service), the value of this parameter may be used as a basis for determining/selecting a suitable UE-relay among a number of the relay capable UEs.

The 'Location Information' parameter in Table 4 means a location of the UE-relay and the location of the UE-relay may be expressed using GPS information. The value of this parameter may be used by an eNB to understand a status of the UE-relay (or UE-relay candidate). Thus, it may be used as a basis for determining/selecting an optimized UE-relay by considering the information on the location of the UE requesting the relay communication together.

The 'Statistics of Relay Requesting UE' parameter in Table 4 may be set to the number of UEs that requests the relay communication (or relay service) around the UE-relay. Alternatively, it may be set to a value indicating whether the number of the UEs is greater than a prescribed threshold. The value of this parameter may be used as a basis for an eNB to adjust (e.g., decrease) a threshold value for UE-relay activation and to adjust (e.g., activate more UE-relays) the number of UEs to be activated as UE-relays.

Figure 14:
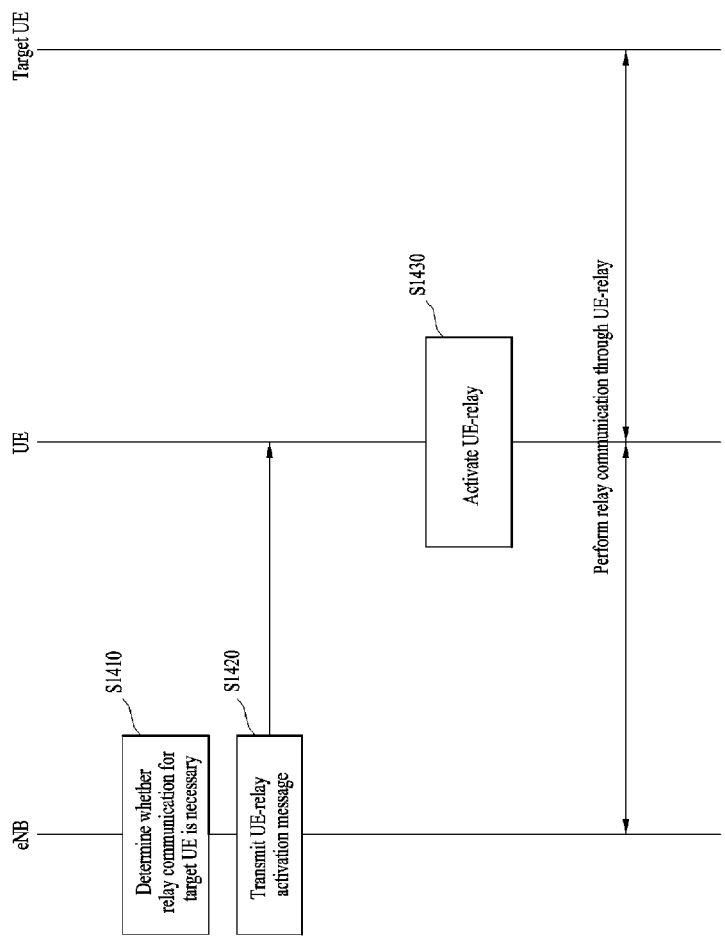
FIG. 14 is a diagram to describe UE-relay related operations according to the present invention.

FIG. 14 is a diagram to describe UE-relay related operations according to the present invention.

In step S1410, an eNB may determine whether relay communication (or relay service) for a target UE is necessary.

Such a determination can be made based on a request (e.g., a request message including the parameters in Table 3) from the target UE in need of the relay communication (or relay service), a status of the target UE (e.g., whether the target UE is out of coverage of the eNB or whether a link quality is degraded), and/or information on the situation of a surrounding cell (this information may be provided by different UE(s), by a different eNB/cell through X2 interface, or by a network node of a core network).

If determining that the relay communication (or relay service) for the target UE is necessary, the eNB may perform an operation of activating a UE-relay for the target UE. Alternatively, in case that a previously activated UE-relay is suitable for the target UE, the eNB may perform an operation of maintaining the activation state or an operation of setting a period of an activation operation of the UE-relay (e.g., a period of announcing relay capability, a period of monitoring peripheral relay requests, etc.) to a relatively small value.

If determining that the relay communication (or relay service) for the target UE is not necessary, the eNB may deactivate the previously activated UE-relay or set the period of the activation operation of the UE-relay (e.g., the period of announcing relay capability, the period of monitoring peripheral relay requests, etc.) to a relatively large value. In case that there is no activated UE-relay for the target UE, the eNB may not perform any operations.

In step S1420, the eNB may transmit a UE-relay activation message to one or more UE-relay candidates capable of providing the relay communication (or relay service) for the target UE. The activation message may be transmitted through a dedicated message (e.g., paging message, attach response message, TAU/RAU response message, etc.) or a broadcast signal. The activation message may include at least one of the parameters in Table 2.

In step S1430, a UE-relay candidate satisfying the conditions given by the activation message may be activated as the UE-relay.

A case that a UE is activated as the UE-relay may include at least one of a case that the UE immediately operates as the UE-relay for the target UE in accordance with the activation message from the eNB (i.e., the UE starts the relay communication), a case that the UE-relay performs an operation of announcing its relay capability (i.e., an operation of enabling surrounding UEs (the target UE may be included) to discover the UE-relay), and a case that the UE-relay performs an operation of monitoring relay requests from the surrounding UEs (i.e., an operation of discovering UEs (the target UE may be included) in need of the UE-relay in the vicinity). For instance, one of the above-mentioned operations can be performed according to an activation type of a UE-relay.

In step S1440, the target UE may perform the relay communication through the eNB and the UE-relay.

Although not shown in FIG. 14, the eNB may perform an operation of receiving information, which becomes a basis for determining whether the relay communication (or relay service) is necessary, from the target UE, the UE-relay (or UE-relay candidate(s)), a different eNB/cell, or a core network.

Although the exemplary method explained in FIG. 14 is represented as a series of operations for clarity, an order of performing the steps may be non-limited by the methods. If necessary, each of the steps can be performed at the same time or can be performed by an order different from each other. And, it is not mandatory to have all steps illustrated in FIG. 14 to implement the method proposed by the present invention.

In the method described with reference to FIG. 14, the aforementioned matters according to various embodiments of the present invention can be independently applied or can be applied to implement two or more embodiments at the same time.

Figure 15:
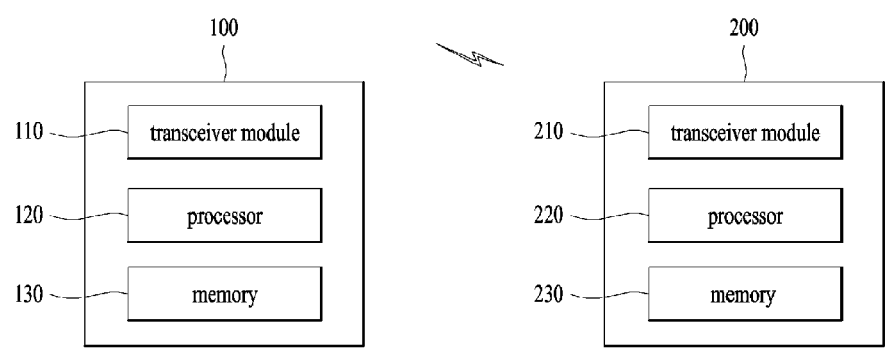
FIG. 15 is a diagram for configurations of a user equipment and a network node device according to a preferred embodiment of the present invention.

FIG. 15 is a diagram for configurations of a user equipment and a network node device according to a preferred embodiment of the present invention.

Referring to FIG. 15, a UE 100 may include a transceiver module 110, a processor 120, and a memory 130. The transceiver module 110 may be configured to transmit and receive various signals, data, and information to/from an external device. The UE 100 may be connected to the external device by wire and/or wirelessly. The processor 120 may control overall operations of the UE 100, and may function to operationally process information to be transmitted and received between the UE 100 and the external device. Moreover, the processor 120 may be configured to perform the UE operation proposed in the present invention. The memory 1300, which may be replaced with an element such as a buffer (not shown in the drawing), may store the processed information for a predetermined time.

Referring to FIG. 15, a network node device 200 according to the present invention may include a transceiver module 210, a processor 220, and a memory 230. The transceiver module 210 may be configured to transmit and receive various signals, data, and information to/from an external device. The network node device 200 may be connected to the external device by wire and/or wirelessly. The processor 220 may control overall operations of the network node device 200, and may function to operationally process information to be transmitted and received between the network node device 200 and the external device. Moreover, the processor 220 may be configured to perform the network node operation proposed in the present invention. The memory 230, which may be replaced with an element such as a buffer (not shown in the drawing), may store the processed information for a predetermined time.

The specific configuration of the UE 100 and the network device 200 may be implemented such that the aforementioned matters according to various embodiments of the present invention can be independently applied or can be applied to implement two or more embodiments at the same time. For clarity, redundant description will be omitted.

The embodiments of the present invention may be implemented using various means. For instance, the embodiments of the present invention may be implemented using hardware, firmware, software and/or any combinations thereof.

In case of the implementation by hardware, a method according to each embodiment of the present invention may be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code may be stored in a memory unit and be then executed by a processor. The memory unit may be provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Therefore, the present invention is non-limited by the embodiments disclosed herein but intends to give a broadest scope matching the principles and new features disclosed herein.

The aforementioned embodiments of the present invention are applicable to various mobile communication systems.

What is claimed is:

1. A method of supporting a user equipment (UE) to UE (UE-to-UE) communication by a network in a wireless communication system, the method comprising:
    transmitting a system information block related to the UE-to-UE communication,
    wherein the system information block contains a period parameter for a periodicity at which a relay UE transmits a discovery announcement,
    wherein the system information block contains a high threshold value and a low threshold value,
    wherein the relay UE is not allowed to transmit the discovery announcement when a reference signal received power (RSRP) measured by the relay UE is above the high threshold value, and
    wherein the relay UE is not allowed to transmit the discovery announcement when the RSRP measured by the relay UE is below the low threshold value.

2. The method according to claim 1,
    wherein the relay UE is allowed to transmit the discovery announcement when the RSRP measured by the relay UE is in-between the high threshold value and the low threshold value.

3. The method according to claim 1, further comprising:
    transmitting a message to the relay UE to initiate the UE-to-UE communication.

4. The method according to claim 1,
    wherein the system information block is transmitted through a broadcast message.

5. The method according to claim 1,
    wherein when the period parameter is not included in the system information block, a default announcing period is used by the relay UE.

6. A method of supporting a user equipment (UE) to UE (UE-to-UE) communication by a UE operating as a relay UE in a wireless communication system, the method comprising:
- receiving, by the UE, a system information block related to the UE-to-UE communication,
- wherein the system information block contains a period parameter for a periodicity at which the UE transmits a discovery announcement,
- wherein the system information block contains a high threshold value and a low threshold value,
- wherein the UE is not allowed to transmit the discovery announcement when a reference signal received power (RSRP) measured by the UE is above the high threshold value, and
- wherein the UE is not allowed to transmit the discovery announcement when the RSRP measured by the UE is below the low threshold value.

7. The method according to claim 6, further comprising:
- initiating the UE-to-UE communication, when the RSRP measured by the UE is in-between the high threshold value and the low threshold value.

8. The method according to claim 6,
- wherein the system information block is received through a broadcast message.

9. The method according to claim 6,
- wherein when the period parameter is not included in the system information block, the UE uses a default announcing period.

10. The method according to claim 6,
- wherein the discovery announcement includes announcing a relay capability.

11. A method of supporting a user equipment (UE) to UE (UE-to-UE) communication by a network in a wireless communication system, the method comprising:
- transmitting a system information block related to the UE-to-UE communication,
- wherein the system information block contains a period parameter for a periodicity at which a relay UE transmits a discovery announcement announcing a relay capability,
- wherein the system information block contains a high threshold value,
- wherein the relay UE is allowed to transmit the discovery announcement when a reference signal received power (RSRP) measured by the relay UE is below the high threshold value, and
- wherein the relay UE is not allowed to transmit the discovery announcement when the RSRP measured by the relay UE is above the high threshold value.

12. The method according to claim 11,
- wherein the system information block further contains a low threshold value,
- wherein the relay UE is allowed to transmit the discovery announcement when the RSRP measured by the relay UE is above the low threshold value, and
- wherein the relay UE is not allowed to transmit the discovery announcement when the RSRP measured by the relay UE is below the low threshold value.

13. The method according to claim 11, further comprising:
- transmitting a message to the relay UE to initiate the UE-to-UE communication.

14. The method according to claim 11,
- wherein the system information block is transmitted through a broadcast message.

15. The method according to claim 11,
- wherein when the period parameter is not included in the system information block, a default announcing period is used by the relay UE.

16. A method of supporting a user equipment (UE) to UE (UE-to-UE) communication by a UE operating as a relay UE in a wireless communication system, the method comprising:
- receiving, by the UE, a system information block related to the UE-to-UE communication,
- wherein the system information block contains a period parameter for a periodicity at which the UE transmits a discovery announcement announcing a relay capability,
- wherein the system information block contains a high threshold value,
- wherein the UE is allowed to transmit the discovery announcement when a reference signal received power (RSRP) measured by the UE is below the high threshold value, and
- wherein the UE is not allowed to transmit the discovery announcement when the RSRP measured by the UE is above the high threshold value.

17. The method according to claim 16,
- wherein the system information block further contains a low threshold value,
- wherein the UE is allowed to transmit the discovery announcement when the RSRP measured by the UE is above the low threshold value, and
- wherein the UE is not allowed to transmit the discovery announcement when the RSRP measured by the UE is below the low threshold value.

18. The method according to claim 17, further comprising:
- initiating the UE-to-UE communication, when the RSRP measured by the UE is in-between the high threshold value and the low threshold value.

19. The method according to claim 16,
- wherein the system information block is received through a broadcast message.

20. The method according to claim 16,
- wherein when the period parameter is not included in the system information block, the UE uses a default announcing period.

* * * * *